(12) United States Patent
Jelly et al.

(10) Patent No.: US 10,597,978 B2
(45) Date of Patent: Mar. 24, 2020

(54) HYDRAULICALLY ASSISTED SHEAR BOLT

(71) Applicant: Halliburton Energy Services, Inc., Houston, TX (US)

(72) Inventors: Christian Alexander Jelly, Perth (AU); Cole Alexander Benson, Perth (AU)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/568,388

(22) PCT Filed: Dec. 28, 2016

(86) PCT No.: PCT/US2016/068819
§ 371 (c)(1),
(2) Date: Oct. 20, 2017

(87) PCT Pub. No.: WO2018/125075
PCT Pub. Date: Jul. 5, 2018

(65) Prior Publication Data
US 2018/0320480 A1  Nov. 8, 2018

(51) Int. Cl.
*E21B 34/06* (2006.01)
*E21B 41/00* (2006.01)
(Continued)

(52) U.S. Cl.
CPC .............. *E21B 41/00* (2013.01); *E21B 17/06* (2013.01); *E21B 23/04* (2013.01); *E21B 34/063* (2013.01); *E21B 7/061* (2013.01); *F16B 31/021* (2013.01)

(58) Field of Classification Search
None
See application file for complete search history.

(56) References Cited

U.S. PATENT DOCUMENTS 3,174,549 A    3/1965  Anderson
3,386,138 A    6/1968  Overman
(Continued)

FOREIGN PATENT DOCUMENTS

CA    2405993      10/2001
CN    101875404    11/2010
(Continued)

OTHER PUBLICATIONS

International Patent Application No. PCT/US2016/068819, "International Search Report and Written Opinion", dated Sep. 11, 2017, 19 pages.
(Continued)

*Primary Examiner* — Matthew R Buck
*Assistant Examiner* — Douglas S Wood
(74) *Attorney, Agent, or Firm* — Kilpatrick Townsend & Stockton LLP

(57) ABSTRACT

A shear bolt can include a body having a shear portion. A port in the body may be used for introducing a fluid into the body. A core disposed in the body may include a chamber at least partially surrounded by the shear portion. A fluid pressure in the chamber and exerted against the shear portion may be increasable in response to the fluid being introduced through the port, such as to increase an amount of stress in the shear portion and prime the shear bolt for shearing. Additionally or alternatively, a support structure positioned in the chamber may be frangible to reduce support to the shear portion in response to the fluid being introduced through the port, for example, to contribute to priming the shear bolt for shearing.

15 Claims, 7 Drawing Sheets

(51) Int. Cl.
*E21B 23/04* (2006.01)
*E21B 17/06* (2006.01)
*F16B 31/02* (2006.01)
*E21B 7/06* (2006.01)

(56) References Cited

U.S. PATENT DOCUMENTS

| | | |
|---|---|---|
| 3,408,890 A | 11/1968 | Bochman, Jr. |
| 4,400,112 A | 8/1983 | Castel et al. |
| 4,518,037 A | 5/1985 | Youngblood et al. |
| 4,842,062 A | 6/1989 | Schneider et al. |
| 5,035,292 A | 7/1991 | Bailey et al. |
| 5,341,883 A | 8/1994 | Ringgenberg |
| 5,595,247 A | 1/1997 | Braddick |
| 5,765,641 A | 6/1998 | Shy et al. |
| 5,806,596 A | 9/1998 | Hardy et al. |
| 5,878,818 A | 3/1999 | Hebert et al. |
| 5,894,889 A | 4/1999 | Dewey et al. |
| 6,035,939 A | 3/2000 | Carter |
| 6,050,334 A | 4/2000 | McGarian et al. |
| 6,464,002 B1 | 10/2002 | Hart et al. |
| 6,550,551 B2 | 4/2003 | Brunnert et al. |
| 6,719,045 B2 | 4/2004 | Hart et al. |
| 6,834,726 B2 | 12/2004 | Giroux et al. |
| 6,915,845 B2 | 7/2005 | Leising et al. |
| 7,077,204 B2 | 7/2006 | Dewey et al. |
| 7,878,253 B2 | 2/2011 | Stowe et al. |
| 7,963,341 B2 | 6/2011 | Rios, III et al. |
| 7,980,307 B2 | 7/2011 | Saylor, III |
| 8,430,173 B2 | 4/2013 | Todd et al. |
| 8,555,960 B2 | 10/2013 | Mailand et al. |
| 8,555,983 B2 | 10/2013 | Palacios |
| 8,794,331 B2 | 8/2014 | Stromquist et al. |
| 8,813,848 B2 | 8/2014 | Frazier |
| 8,910,717 B2 * | 12/2014 | Mailand .............. E21B 34/06 166/317 |
| 9,273,534 B2 | 3/2016 | Merron et al. |
| 9,291,031 B2 | 3/2016 | Frazier et al. |
| 9,568,038 B2 * | 2/2017 | Donovan .............. F16B 31/021 |
| 2002/0023757 A1 | 2/2002 | George et al. |
| 2002/0195243 A1 | 12/2002 | Hart et al. |
| 2005/0039905 A1 | 2/2005 | Hart et al. |
| 2010/0012322 A1 | 1/2010 | McGarian et al. |
| 2010/0224372 A1 | 9/2010 | Stowe et al. |
| 2011/0215564 A1 | 9/2011 | Abrams |
| 2013/0112422 A1 | 5/2013 | Biddick et al. |
| 2015/0041148 A1 | 2/2015 | Greenan |

FOREIGN PATENT DOCUMENTS

| | | |
|---|---|---|
| CN | 202882858 | 4/2013 |
| KR | 19980052164 | 10/1998 |
| RU | 2166058 | 4/2001 |
| RU | 2289670 | 12/2006 |
| RU | 2644364 | 2/2018 |
| WO | 0058594 | 10/2000 |
| WO | 2014178725 | 11/2014 |
| WO | 2015053760 | 4/2015 |
| WO | 2015069909 | 5/2015 |
| WO | 2015117224 | 8/2015 |

OTHER PUBLICATIONS

RU2019113552, "Notice of Decision to Grant", Dec. 13, 2019, 17 pages.

* cited by examiner

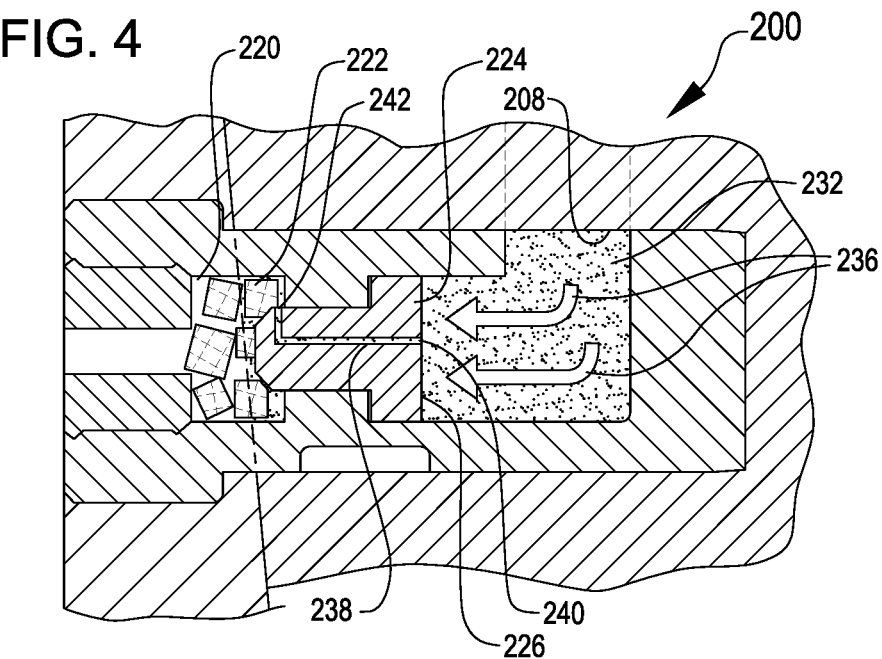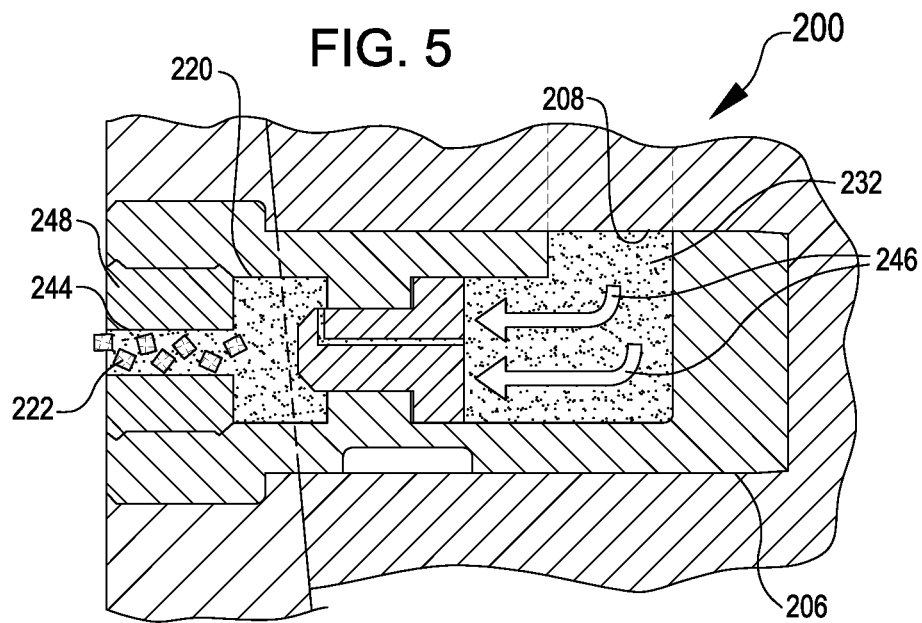

US 10,597,978 B2

HYDRAULICALLY ASSISTED SHEAR BOLT

TECHNICAL FIELD

The present disclosure relates generally to mechanical devices, and more particularly but not exclusively to shear bolts that can be used to couple components of tool assemblies, such as a tool assembly that may be deployed via a tool string in a wellbore.

BACKGROUND

A well system, such as an oil or gas well, can include a wellbore drilled through a subterranean formation for extracting hydrocarbons from the subterranean formation. Tool assemblies deployed into the wellbore may include multiple components or devices coupled together. For example, a tool assembly may be deployed with a whipstock that is coupled to a mill using a shear bolt. In some examples, one or more tools may be disconnected from the tool assembly prior to retrieving the tool assembly from the wellbore.

During deployment, a large amount of force may be applied to a tool assembly to shear a shear bolt coupling between tools. Some shear bolts may be designed to shear at an amount of force lower than the amount of force applied to the tool assembly during deployment. For situations in which a shear bolt experiences unintended forces downhole that exceed the shear strength of the shear bolt, the shear bolt may shear and thereby prematurely decouple components of the tool assembly. Prematurely decoupling components of the tool assembly may result in costly delays or retrieval operations.

BRIEF DESCRIPTION OF THE DRAWINGS

FIG. 4 is a cross-sectional view of the hydraulically assisted shear bolt of FIGS. 2-3 with the support structure fractured according to some aspects.

FIG. 5 is a cross-sectional view of the hydraulically assisted shear bolt of FIGS. 2-4 with a check valve engaged for release of fluid according to some aspects.

DETAILED DESCRIPTION

Figure 1:
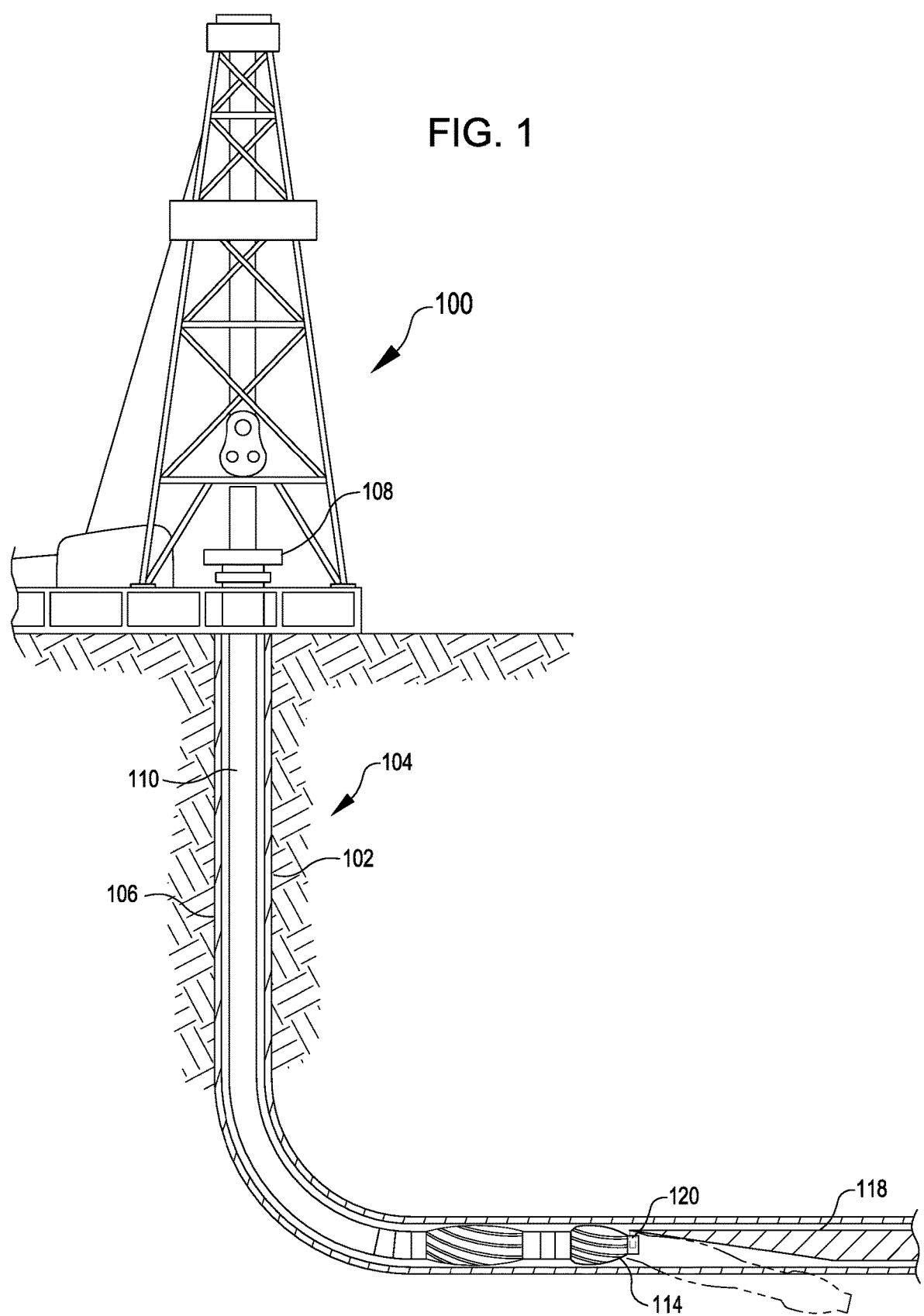
FIG. 1 is a cross-sectional side view of an example of a well system that includes a hydraulically assisted shear bolt in the wellbore according to some aspects.

Certain aspects and features of the present disclosure relate to a hydraulically assisted shear bolt usable in a wellbore tool or other suitable tool assemblies. The hydraulically assisted shear bolt can retain components coupled together relative to each other in a particular arrangement while the components are moved into a desired position within a wellbore. The hydraulically assisted shear bolt may have an initial configuration that is able to withstand large amounts of force that may be encountered while moving to the desired position. Upon reaching the desired position, however, it may be difficult to impart a force that is sufficiently large to overcome the strength of the hydraulically assisted shear bolt in the initial configuration so that the coupled components can separate for deployment. For example, the hydraulically assisted shear bolt may have passed through a tortuous, deviated, or other portion of the wellbore that causes frictional resistance to tool string movement and a corresponding loss of available force that can be brought to bear on the hydraulically assisted shear bolt. Hydraulic fluid may be communicated to transition the hydraulically assisted shear bolt into another configuration susceptible to decoupling in response to experiencing reduced (e.g., achievable or existing) levels of force to cause separation of the coupled pieces for deployment.

In one example, the hydraulically assisted shear bolt can include a body defining a shear portion at which the bolt is to be sheared. An inner core of the hydraulically assisted shear bolt can be at least partially surrounded by the shear portion. The hydraulically assisted shear bolt can also include a port defining a fluid path for fluid to be introduced into the shear bolt, such as into a chamber defined by the body. Fluid introduced through the port may manipulate the core and cause the shear bolt to transition from the initial (e.g., stronger) configuration to the subsequent (e.g., weaker) configuration.

In some aspects, the core may include a support matrix or other support structure that reinforces the shear portion but that can also be physically changed or otherwise weakened due to the fluid being introduced into the body through the port. Weakening the support structure may at least partially eliminate the reinforcement available to the shear portion and thus cause the shear portion to be weaker and susceptible to breakage under reduced levels of force. In some aspects, the support structure may be weakened by fracturing in response to pressure communicated from the fluid introduced through the port. For example, hydraulic fluid introduced through the port may exert pressure on the support structure through an intervening piston, through another fluid pressurized by a piston moved by the hydraulic fluid, through pressure exerted by the hydraulic fluid by direct contact with the support structure, or any suitable combination of these or other possibilities. In some aspects, the support structure may be weakened by chemically reacting with the fluid introduced by the port or with some other chemical agent released due to the fluid being introduced through the port. For example, the support structure may dissolve, corrode, or otherwise chemically change to a different, weaker state that may reduce an amount of support provided to the shear portion.

In some aspects, the core may be arranged to exert pressure against the shear portion to increase an amount of stress in the shear portion in response to fluid being introduced through the port. For example, the core may include a chamber at least partially surrounded by the shear portion. Fluid introduced through the port may cause an increase in fluid pressure in the chamber. For example, fluid introduced through the port may be directly communicated into the chamber or may exert pressure on a piston that in turn exerts pressure on another fluid in the chamber. Increasing fluid pressure in the chamber may communicate pressure to the shear portion and increase an amount of stress in the shear portion. Increasing an amount of stress in the shear portion may cause the shear portion to break or may reduce an amount of force needed from external to the body to cause breakage.

These illustrative examples are given to introduce the reader to the general subject matter discussed here and are not intended to limit the scope of the disclosed concepts. The following describes various additional features and examples with reference to the drawings, in which like numerals indicate like elements, and in which directional descriptions are used to describe the illustrative aspects. Like the illustrative aspects, the numerals and directional descriptions should not be used to limit the present disclosure.

FIG. 1 is a cross-sectional side view of an example of a well system 100 that includes a wellbore 102 and a hydraulically assisted shear bolt 120 according to some aspects. The wellbore 102 can extend through various earth strata that form a subterranean formation 104. The wellbore 102 can be vertical, deviated, horizontal, or any combination of these. The wellbore 102 can be positioned onshore or offshore.

A casing string 106 can extend from the well surface 108 to the subterranean formation 104. The casing string 106 can extend partially or entirely through the wellbore 102. In some examples, the casing string 106 can be formed from multiple casing strings having the same or different diameters from one another. The casing string 106 can provide a conduit through which formation fluids (such as production fluids produced from the subterranean formation 104) can travel from the wellbore 102 to the well surface 108. The casing string 106 can be coupled to the walls of the wellbore 102 via cement. For example, a cement sheath can be positioned or formed between the casing string 106 and the walls of the wellbore 102 for coupling the casing string 106 to the wellbore 102.

In the example shown in FIG. 1, the wellbore 102 includes a well tool 110. The well tool 110 can include a logging while drilling (LWD) tool or a measuring while drilling (MWD) tool. In some examples, the well tool 110 can be coupled to a wireline, slickline, or coiled tube for deploying the well tool 110 into the wellbore 102. The well tool 110 can include various sensors, subsystems, and components. For example, the well tool 110 can include a communication subsystem, a saver subsystem, a rotary steerable system, a mud motor, a MWD module, a bottom hole assembly, a gap subsystem, a drill bit 114, or any combination of these. In other examples, the wellbore 102 may not include the well tool 110.

The well tool 110 can include components releasably coupled together by the hydraulically assisted shear bolt 120. The components may be separable from one another within the wellbore 102 by shearing the hydraulically assisted shear bolt 120, for example, after manipulating the hydraulically assisted shear bolt 120 from a stronger configuration to weaker one. In the example shown in FIG. 1, the coupled components are a drill bit (or milling assembly) 114 and a whipstock 118 that can be run into the wellbore 102 coupled together by the hydraulically assisted shear bolt 120. At a suitable location, the whipstock 118 can be secured in place (e.g., through use of a packer or other suitable device).

The hydraulically assisted shear bolt 120 can be manipulated (e.g., receive hydraulic fluid or fluid pressure through a hydraulic control line) to prime or prepare the hydraulically assisted shear bolt 120 to shear. In some aspects, forces acting on the hydraulically assisted shear bolt 120 may be of sufficiently high magnitude that manipulating the hydraulically assisted shear bolt 120 causes shearing. In other aspects, manipulating the hydraulically assisted shear bolt 120 may instead stress, weaken, or otherwise prepare the hydraulically assisted shear bolt 120 so that shearing may be accomplished by the application of additional forces (e.g., by moving the well tool 110 relative to the wellbore to push or pull against the hydraulically assisted shear bolt 120 and generate corresponding compression or tension forces).

Shearing the hydraulically assisted shear bolt 120 may allow separation of coupled components from one another, such as separation of the milling assembly 114 from the whipstock 118. Such separation may permit the milling assembly 114 to travel along the whipstock 118 (e.g., as shown in phantom line in FIG. 1), for example, to begin milling a new branch for the wellbore 102 without performing separate trips to run the milling assembly 114 and whipstock 118 into the wellbore 102.

Use of the hydraulically assisted shear bolt 120 to facilitate separating of components from one another within the wellbore 102 may allow well operations to be performed without incurring additional time and expense to run separate well tools 110 into and out of the wellbore to place separate components. Moreover, use of the hydraulically assisted shear bolt 120 may permit coupled components to withstand large forces that may be encountered during movement of components to a desired position, yet permit the components to be de-coupled from one another by the application of forces that are significantly lower. As an illustrative example, components coupled by the hydraulically assisted shear bolt 120 may be able to withstand forces of 70,000 pounds while the hydraulically assisted shear bolt 120 is in an initial configuration as the components are moved into position, yet upon providing hydraulic fluid or otherwise manipulating the hydraulically assisted shear bolt 120, shearing may be accomplished in response to forces of 45,000 pounds or less. Other thresholds, however, may additionally or alternatively be implemented, for example, by varying materials and/or dimensions of different elements of the hydraulically assisted shear bolt 120.

Figure 2:
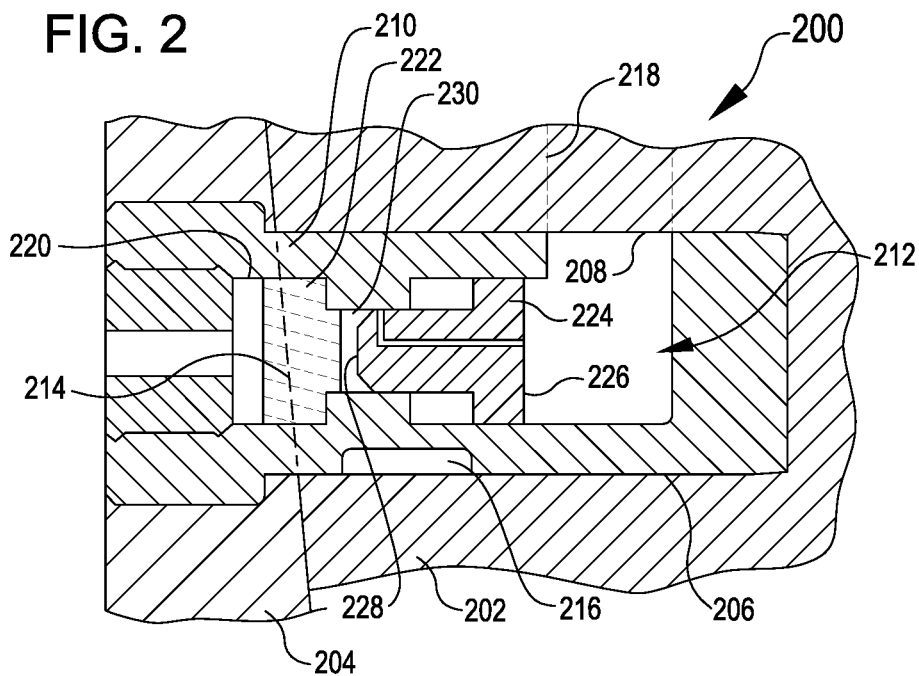
FIG. 2 is a cross-sectional view of an example of a hydraulically assisted shear bolt that includes a core with a fracturable support structure according to some aspects.

Different types of hydraulically assisted shear bolt 120 can be used in the well system 100 depicted in FIG. 1. For example, FIG. 2 is a cross-sectional view showing an example of a hydraulically assisted shear bolt 200 according to some aspects. The hydraulically assisted shear bolt 200 shown in FIG. 2 is coupling together a first component 202 with a second component 204. The first component 202 and the second component 204 may correspond to the milling assembly 114 and whipstock 118 of FIG. 1 or any other components releasably coupled together in a wellbore. Other examples may include elements of a sliding sleeve or other devices that are to be retained in a first position or relative arrangement during deployment of the tool string and moved to another position or relative arrangement after the tool string is positioned at a desired location in the wellbore. As described in greater detail below, the hydraulically assisted shear bolt 200 may be manipulated to transition between different states to facilitate shearing of the hydraulically assisted shear bolt 200 that may permit the coupled first component 202 and second component 204 to separate or shift positions relative to one another.

The hydraulically assisted shear bolt 200 can include a body 206, a port 208, a shear portion 210, and a core 212. The port 208, the shear portion 210, and the core 212 may each respectively be formed at least partially within the body 206.

The shear portion 210 may correspond to a portion of the body 206 at which shearing may occur during use of the hydraulically assisted shear bolt 200. For example, the shear portion 210 may be aligned along a shear plane 214 (shown in dashed lines in FIG. 2). Factors such as materials and dimensions of the body 206 and alignment of the body 206 with the other components (such as the first component 202, the second component 204, or any other component which may transfer force to the body 206) may affect an orientation of the shear plane 214. In some aspects, the shear portion 210 may have a smaller cross-sectional area in comparison to another portion of the body 206.

In some aspects, the body 206 may include groove 216 or other orienting feature that will only allow insertion of the body 206 in a particular orientation. For example, the groove 216 may be arranged so that the shear plane 214 when installed will align with a juncture or a seam between the first component 202 and the second component 204. Additionally or alternatively, engaging features such as threads or other mating surfaces may be utilized to hold the hydraulically assisted shear bolt 200 in place or for appropriate alignment relative to other elements.

The port 208 can be in fluid communication with a fluid conduit 218. The fluid conduit 218 may provide fluid from a hydraulic control line extending to the surface of the well system 100, for example. In some aspects, the fluid conduit 218 may provide fluid from another source, such as from within the wellbore 102, for example, in response to devices controlled by operators at a surface of the wellbore 102 or automated elements. Fluid may be introduced through the port 208 into the body 206 of the hydraulically assisted shear bolt 200.

The core 212 may be manipulable (e.g., in response to fluid introduced through the port 208) to change the hydraulically assisted shear bolt 200 between different configurations. For example, the core 212 may be manipulable to change the hydraulically assisted shear bolt 200 from an initial configuration capable of withstanding high levels of force to a primed configuration susceptible to shearing at lower levels of force.

The core 212 shown in FIG. 2 includes a chamber 220, a support matrix or other support structure 222, and a piston 224. The chamber 220 can be at least partially surrounded by the shear portion 210.

The support structure 222 may be positioned in the chamber 220. For example, the support structure 222 may be positioned to span between parts of the shear portion 210. The support structure 222 may reinforce the shear portion 210. For example, the support structure 222 may be positioned so that the shear plane 214 passes through at least a portion of the support structure 222.

The support structure 222 may be frangible. For example, the support structure 222 may be susceptible to fracturing or breaking apart in response to the exertion of force on it or may be susceptible to chemical reactions to dissolve, break apart, or otherwise weaken. Examples of suitable materials for the support structure 222 may include ceramic materials, glass materials, cement materials, epoxy materials, resin materials, polymer materials, compressed and consolidated sand and salt mixtures, compressed and consolidated salt, other compressed and consolidated granular materials, aluminum materials, magnesium materials, hydrolytically degradable polymer materials, dissolvable elastomer materials, anhdyrous boron compounds, silicone, or combinations of these or other materials. Examples of substances that may be introduced (e.g., via fluid introduced through the port 208 or elsewhere) into contact with the support structures 222 to cause a chemical reaction for dissolving or otherwise weakening may include oil-based or water-based drilling mud or hydraulic fluid. In some aspects, the support structure 222 may be a support matrix that includes constituent parts that are combined or joined together in one state (e.g., in an initial state of the hydraulically assisted shear bolt 200) and disconnected, separate from one another, or otherwise arranged differently in another state (e.g., in a subsequent state in which the hydraulically assisted shear bolt 200 has been primed for shearing).

The piston 224 may include a first face 226 and a second face 228. The first face 226 may be arranged to receive fluid introduced through the port 208. The second face 228 may be opposite the first face 226 on the piston 224. In the arrangement shown in FIG. 2, the second face 228 is spaced apart from the support structure 222 by a gap 230.

Figure 3:
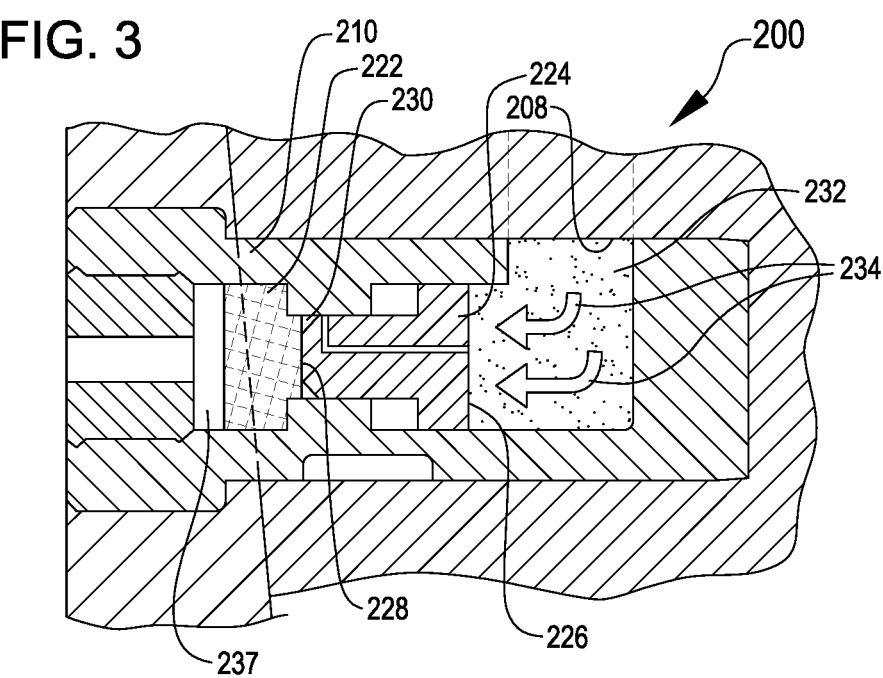
FIG. 3 is a cross-sectional view of the hydraulically assisted shear bolt of FIG. 2 in which hydraulic fluid is received according to some aspects.

FIG. 3 is a cross-sectional view showing the hydraulically assisted shear bolt 200 in a state of receiving a first fluid 232 according to some aspects. The first fluid 232 may be introduced through the port 208 and ultimately cause the support structure 222 to fracture. For example, the introduced first fluid 232 may exert a force on the first face 226 of the piston 224, as illustrated by arrows 234 in FIG. 3. This may cause the piston 224 to move through the gap 230 and exert force on the support structure 222. For example, movement of the piston 224 through the gap 230 may cause the second face 228 of the piston 224 to move into pressure-exerting contact with the support structure 222 (e.g., from the position shown in FIG. 2 to the position shown in FIG. 3). Additionally or alternatively, movement of the piston 224 through the gap 230 may generate fluid pressure that may be exerted against the support structure 222, for example from a second fluid (if present in the gap 230) becoming increasingly pressurized by movement of the piston 224.

Pressure applied to the support structure 222 may cause the support structure 222 to begin to fracture (e.g., as illustrated by additional crosshatching in FIG. 3 compared to FIG. 2). In a fractured state, the support structure 222 may provide a reduced amount of reinforcement to the shear portion 210.

FIG. 4 is a cross-sectional view showing the hydraulically assisted shear bolt 200 with the support structure 222 fractured according to some aspects. Additional introduction of fluid 232 through the port 208 may cause additional movement of the piston 224 (as illustrated by arrows 236). Additional movement of the piston 224 may cause additional fracturing or breaking apart of support structure 222. For example, in comparison to FIG. 3 (in which a space 237 in the chamber 220 is shown unoccupied by the support structure 222), the support structure 222 in FIG. 4 is shown broken into pieces that at least partially occupy the space 237 (FIG. 3).

In some aspects, the piston 224 includes a bypass conduit 238. The bypass conduit 238 may permit passage of the first fluid 232 from the port 208 to the chamber 220. For example, the bypass conduit 238 may include an inlet 240 in the first face 226 or otherwise in fluid communication with the port 208. The bypass conduit 238 may include an outlet 242 arranged in the piston 224 so that the outlet 242 will be moved into fluid communication with the chamber 220 upon completing a predetermined amount of movement of the piston 224 (e.g., upon reaching the position shown in FIG. 4). In some aspects, the support structure 222 may comprise material that is dissolvable in response to contact with the first fluid 232 or a mixture of the first fluid 232 with a chemical agent mixed into the first fluid 232 en route to the support structure 222. Thus, the bypass conduit 238 in some aspects can permit a flow of the first fluid 232 for facilitating dissolving the support structure 222. In some aspects, the bypass conduit 238 additionally or alternatively can permit a flow of the first fluid 232 into the chamber 220 that allows a pressure in the chamber 220 to be increased.

FIG. 5 is a cross-sectional view showing the hydraulically assisted shear bolt 200 evacuating fluid according to some aspects. The body 206 may include a check valve 244. In some aspects, the check valve 244 may be included in a cap 248 used to close off or seal the body 206 upon introduction of other elements into the body 206 during fabrication. The check valve 244 may include an appropriate structure for allowing fluid to exit the body 206 (e.g., flow in a leftward direction in FIG. 5) and prevent fluid from traveling in an opposite direction to enter the body 206 (e.g., flow in a rightward direction FIG. 5). Additional fluid introduction through the port 208 (e.g., as illustrated by arrows 246) may increase pressure in the chamber 220, overcome a pressure outside of the check valve 244, and cause fluid (and any particles of the support structure 222 small enough to fit through the check valve 244) to flow out of the chamber 220 through the check valve 244.

Figure 6:
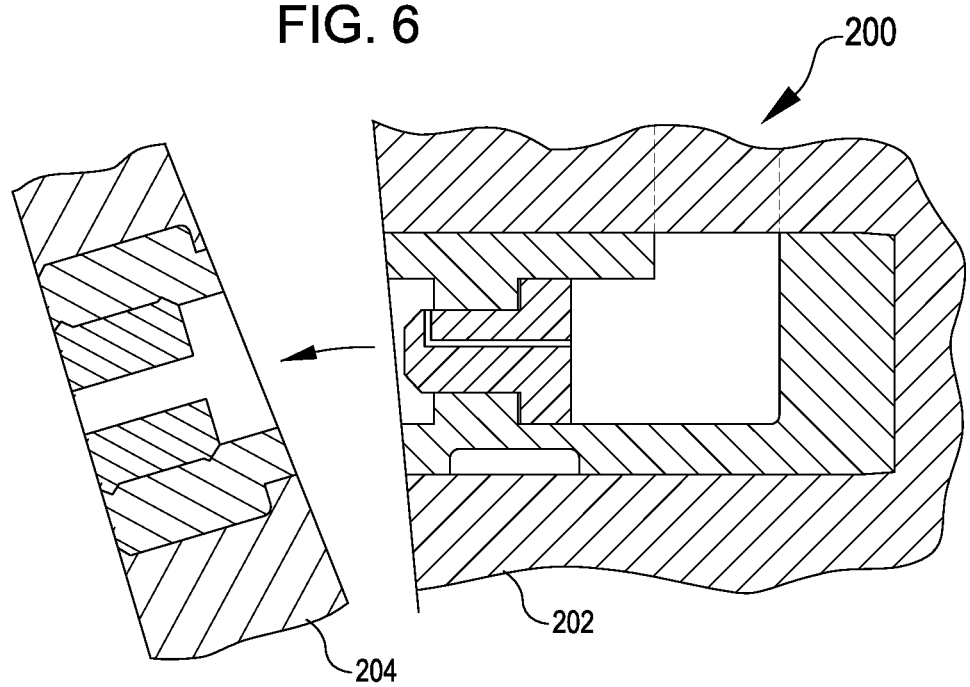
FIG. 6 is a cross-sectional view of the hydraulically assisted shear bolt of FIGS. 2-5 in a sheared state according to some aspects.

FIG. 6 is a cross-sectional view showing the hydraulically assisted shear bolt 200 in a sheared state according to some aspects. In the sheared state, the first component 202 and the second component 204 may be able to move independently of one another. The hydraulically assisted shear bolt 200 may reach the sheared state in response to forces applied to the hydraulically assisted shear bolt 200. An amount of force sufficient to shear the hydraulically assisted shear bolt 120 may depend on factors such as the cross-sectional area of the shear portion 210 and the yield strength or other material properties of the material or materials from which the hydraulically assisted shear bolt 120 is formed.

Various manipulations of the hydraulically assisted shear bolt 200 may contribute to the hydraulically assisted shear bolt 200 reaching the sheared state. For example, fracturing the support structure 222 as described herein may reduce an amount of reinforcement for the shear portion 210 and result in a corresponding reduction in a magnitude of force sufficient to cause shearing along the shear portion 210. Additionally or alternatively, increasing fluid pressure in the chamber 220 as described herein can cause a corresponding increase in pressure exerted against the shear portion 210, which in turn can increase a concentration of stress in the shear portion 210 and result in an additional or alternative corresponding reduction in a magnitude of force sufficient to cause shearing along the shear portion 210.

In some aspects, the check valve 244 may prevent pressure from building up in the chamber 220 beyond a desired level for operational constraints of hydraulically assisted shear bolt 200. As an illustrative example, the hydraulically assisted shear bolt 200 may have an initial external load capacity of 80,000 pounds when the support structure 222 is intact (e.g., FIG. 2), a reduced external load capacity of 45,000 pounds when the support structure 222 has been fractured (e.g., FIG. 3), and a further reduced external load capacity of 40,000 pounds when an initial amount of fluid 232 has been communicated through the bypass conduit 238 to increase an amount of pressure exerted internally from the chamber 220 into the shear portion 210 (e.g., FIG. 4). In this illustrative example, the check valve 244 can allow additional fluid 232 above a certain pressure threshold to be vented (e.g., FIG. 5), for example, to prevent exertion of additional internal pressure from the chamber to 210 into the shear portion 210 that might cause the external load capacity to fall below 40,000 pounds. Such an arrangement might allow a load exceeding 40,000 pounds to be applied to cause shearing when desired (e.g., FIG. 6), yet prevent loads less than 40,000 pounds from inadvertently causing shearing before desired.

In some aspects, in the sheared state of the hydraulically assisted shear bolt 300, the bypass conduit 238 may permit fluid passage. Such fluid passage may allow fluid to escape and facilitate detection of a pressure drop or other pressure conditions that may be associated with the hydraulically assisted shear bolt 300 undergoing shear and transitioning into the sheared state.

Other variations may also be readily appreciated with respect to FIGS. 2-6. For example, in some aspects, the piston 224 may be omitted and fluid 232 introduced from the port 208 may act directly on the support structure 222 to exert pressure for causing the support structure 222 to fracture. In some aspects, pressure exerted on the support structure 222 (e.g., by the piston 224 or by fluid in the core 212) may cause the support structure 222 to at least partially shift out of the shear plane 214 (e.g., into the space 237) and reduce support for the shear portion 210. In some aspects, the bypass conduit 238 may be omitted and movement of the piston 224 may generate fluid pressure in the chamber 220 for increasing stress in the shear portion 210. In some aspects, the piston 224 may be omitted and fluid 232 introduced through the port 208 may be communicated to generate fluid pressure in the chamber 220 for increasing stress in the shear portion 210.

Figure 7:
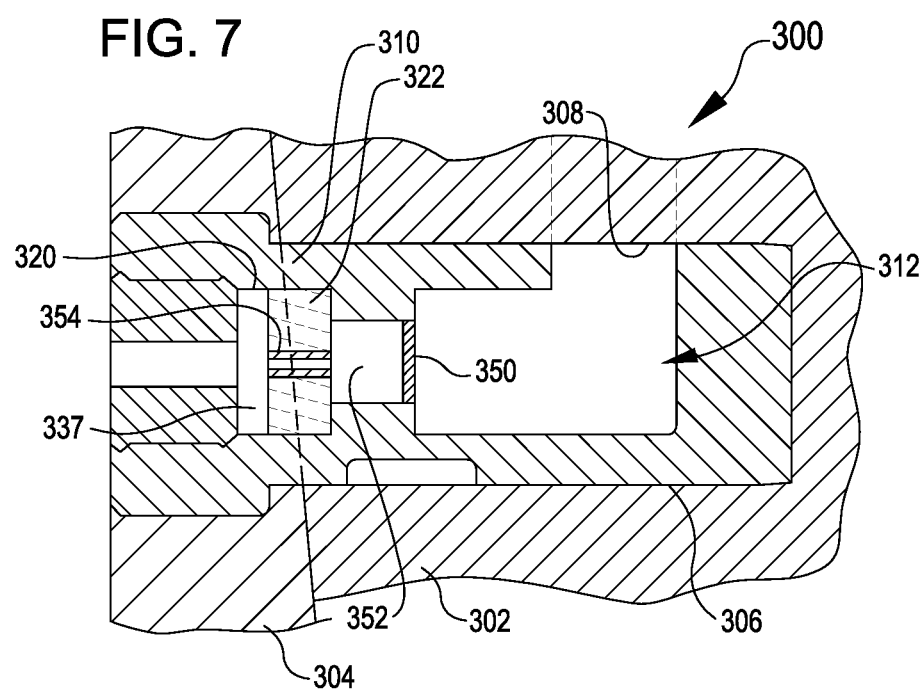
FIG. 7 is a cross-sectional view of an example of a hydraulically assisted shear bolt that includes a core with a dissolvable support structure according to some aspects.

FIG. 7 shows another example of a hydraulically assisted shear bolt 300 according to some aspects. The hydraulically assisted shear bolt 300 shown in FIG. 7 may be manipulated to transition between different states to facilitate shearing of the hydraulically assisted shear bolt 300 that may permit a coupled first component 302 and second component 304 to separate or shift positions relative to one another.

The hydraulically assisted shear bolt 300 can include a body 306, a port 308, a shear portion 310, and a core 312. These and other features may be similar to features of like names described previously herein, and, as such, descriptions of various aspects of such features are not repeated.

The core 312 shown in FIG. 7 includes a rupture disk 350. The rupture disk 350 may be arranged to block fluid communication from the port 308 to the support structure 322 in a pre-rupture state. For example, the rupture disk 350 may seal off a passageway 352 leading to the support structure 322.

The support structure 322 shown in FIG. 7 includes a conduit 354. The conduit 354 is illustrated as a tube extending through the support structure 322 but may additionally or alternatively correspond to any groove, tunnel, recess, or other feature that contributes to a porosity of the support structure 322. In some aspects, a conduit 354 may additionally or alternatively be utilized in other arrangements, such as in the hydraulically assisted shear bolt 200 described above.

In some aspects, the conduit 354 may include a different material than what may be present elsewhere in the support structure 322. For example, the conduit 354 may function to reinforce or weaken the support structure 322, e.g., to obtain a support structure that meets operational criteria for a given scenario.

In some aspects, the conduit 354 provides a fluid path through the support structure 322. For example, the conduit 354 shown in FIG. 7 is arranged to provide fluid communication between the passageway 352 and a space 337 in the chamber 320 that is unoccupied by the support structure 322 in an initial state of the hydraulically assisted shear bolt 300.

Figure 8:
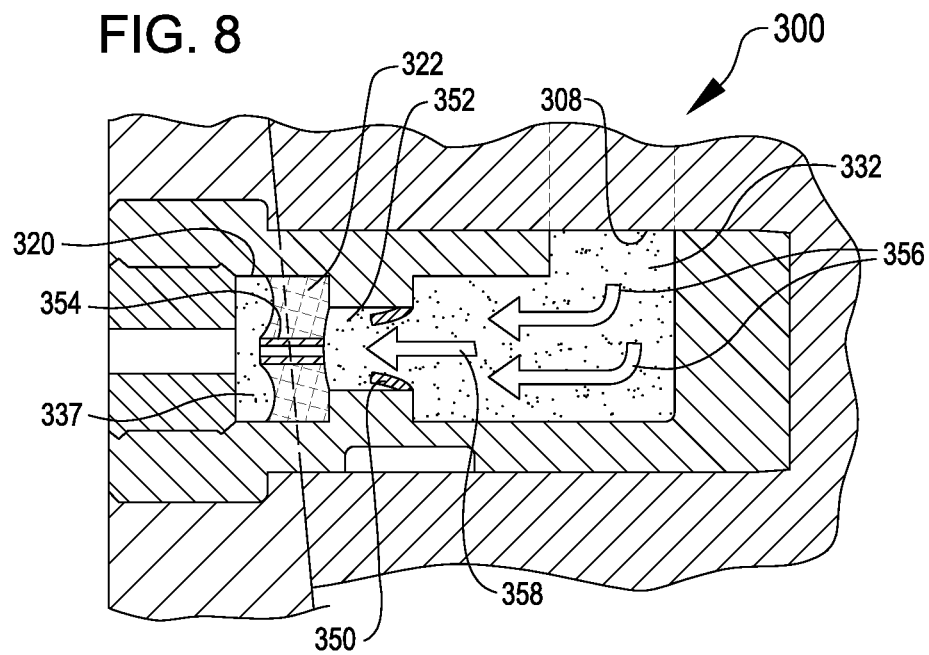
FIG. 8 is a cross-sectional view of the hydraulically assisted shear bolt of FIG. 7 in which hydraulic fluid is received according to some aspects.

FIG. 8 is a cross-sectional view showing the hydraulically assisted shear bolt 300 in a state of receiving fluid 332. The fluid 332 may be introduced through the port 308 and ultimately cause the support structure 322 to dissolve or otherwise chemically react to change to a weakened state. For example, the introduced fluid 332 may exert a force on the rupture disk 350, as illustrated by arrows 356 in FIG. 8. This may cause the rupture disk 350 to rupture and permit flow of the fluid 332 past the rupture disk 350, as illustrated by arrow 358. In some aspects, a vacuum may be maintained by the rupture disk 350 until rupture and may draw the fluid 332 past the rupture disk 350 upon rupture, e.g., into the passageway, 352, conduit 354, space 337, chamber 320, or combination thereof. In some aspects, following rupture, the fluid 332 may mix with other fluid or chemical agents if present in or beyond the rupture disk 350.

The fluid 332 passing the rupture disk 350 or otherwise coming into contact the support structure 322 may be a reactive fluid that is chemically reactive with the support structure 322. For example, the fluid 332 before encountering the rupture disk 350 may have a chemical composition that will react with a material of the support structure 322. In an alternate example, the fluid 332 may mix with other fluid or chemical agent if present in or beyond the rupture disk 350 to yield a chemical composition of the fluid 332 that can react with material of the support structure 322. Although the fluid 332 in FIG. 8 is shown dissolving the support structure 322, the fluid 332 may additionally or alternatively cause corrosion or any other form of chemical reaction that causes the support structure 322 to change into a weaker or more frangible state. In some aspects, the conduit 354 may serve as a path through the support structure 322 that allows the fluid 332 to reach multiple portions of the support structure 322 at once, for example, which may speed up a chemically reactive process of weakening or eliminating the support structure 322.

Figure 9:
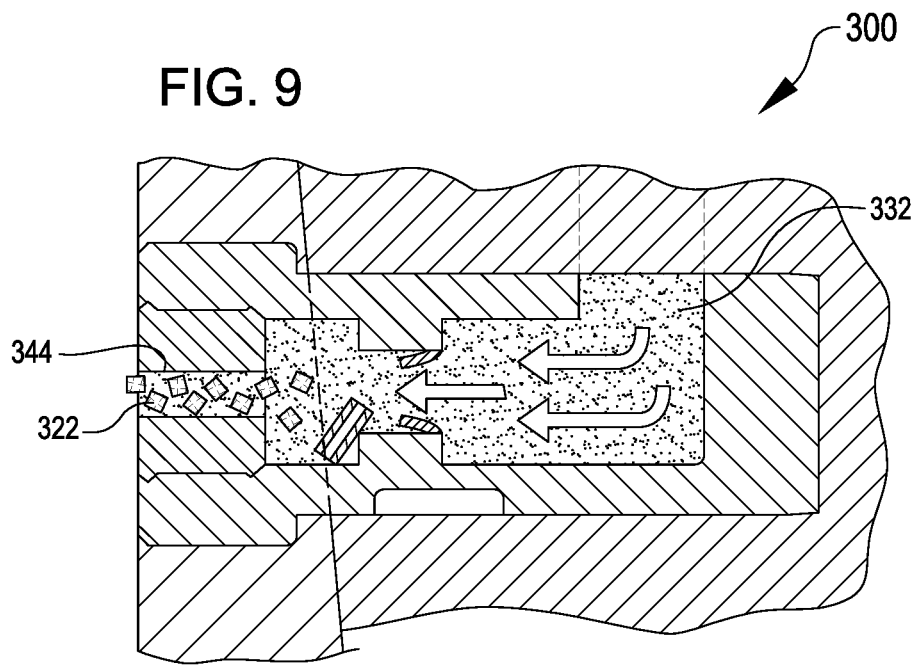
FIG. 9 is a cross-sectional view of the hydraulically assisted shear bolt of FIGS. 7-8 with a check valve engaged for release of fluid according to some aspects.

FIG. 9 is a cross-sectional view showing the hydraulically assisted shear bolt 300 evacuating fluid according to some aspects. A check valve 344 may be utilized to evacuate the fluid 332, which may carry portions of the support structure 322 that are at least partially dissolved or otherwise reduced in size due to the chemical reaction. Additionally or alternatively, the check valve 344 may prevent pressure from building up in the chamber 320 beyond a desired level for operational constraints of hydraulically assisted shear bolt 300, similar to functionality described above with respect to the hydraulically assisted shear bolt 200.

Figure 10:
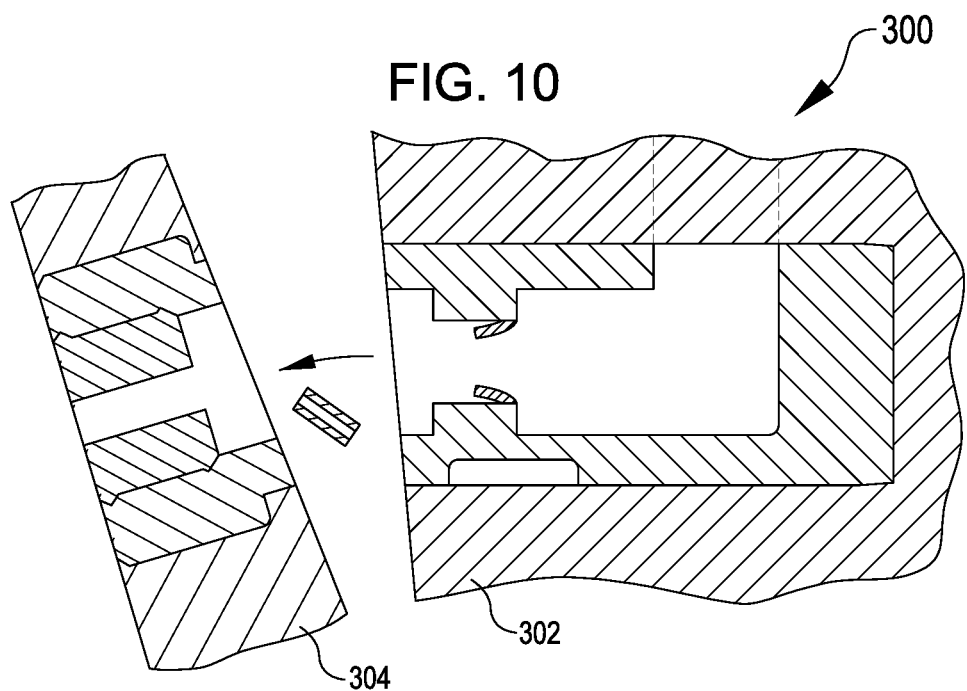
FIG. 10 is a cross-sectional view of the hydraulically assisted shear bolt of FIGS. 7-9 in a sheared state according to some aspects.

FIG. 10 is a cross-sectional view showing the hydraulically assisted shear bolt 300 in a sheared state in which the first component 302 and the second component 304 may be able to move independently of one another according to some aspects. Various manipulations of the hydraulically assisted shear bolt 300 may contribute to the hydraulically assisted shear bolt 300 reaching the sheared state. For example, dissolving or otherwise chemically reacting the support structure 322 with fluid 332 as described herein may reduce an amount of reinforcement for the shear portion 310 and result in a corresponding reduction in a magnitude of force sufficient to cause shearing along the shear portion 310. Additionally or alternatively, increasing fluid pressure in the chamber 320 as described herein can cause a corresponding increase in pressure exerted against the shear portion 310, which in turn can increase a concentration of stress in the shear portion 310 and result in an additional or alternative corresponding reduction in a magnitude of force sufficient to cause shearing along the shear portion 310.

Other variations may also be readily appreciated with respect to the foregoing description. For example, in some aspects, a piston or other member may be moved in response to fluid 332 entering the port 308 and cause a reservoir to rupture or otherwise release a reactive fluid into contact with the support structure.

Figure 11:
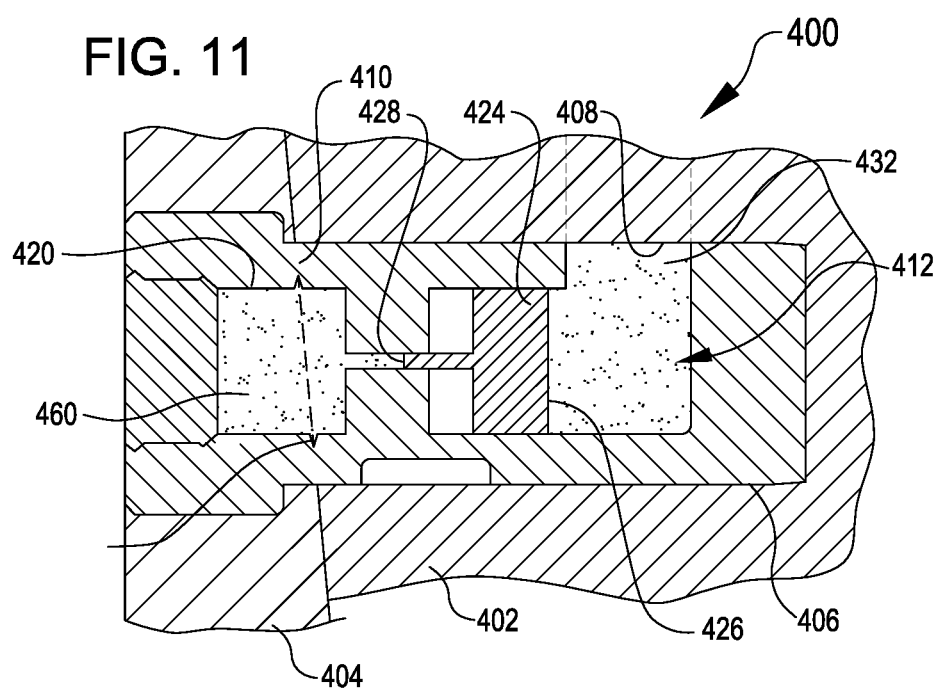
FIG. 11 is a cross-sectional view of an example of a hydraulically assisted shear bolt having a core arranged to exert fluid pressure internally upon a shear portion of the shear bolt according to some aspects.

FIG. 11 shows another example of a hydraulically assisted shear bolt 400 according to some aspects. The hydraulically assisted shear bolt 400 shown in FIG. 11 may be manipulated to transition between different states to facilitate shearing of the hydraulically assisted shear bolt 400 that may permit a coupled first component 402 and second component 404 to separate or shift positions relative to one another.

The hydraulically assisted shear bolt 400 can include a body 406, a port 408, a shear portion 410, and a core 412. These and other features may be similar to features of like names described previously herein, and, as such, descriptions of various aspects of such features are not repeated.

The core 412 shown in FIG. 11 includes a piston 424. The piston 224 may include a first face 426 and a second face 428. The first face 426 may be arranged to receive a first fluid introduced through the port 408. The second face 428 may be opposite the first face 426 on the piston 424. In the arrangement shown in FIG. 11, the second face 228 is in fluid communication with a second fluid 460 contained within the chamber 420.

Figure 12:
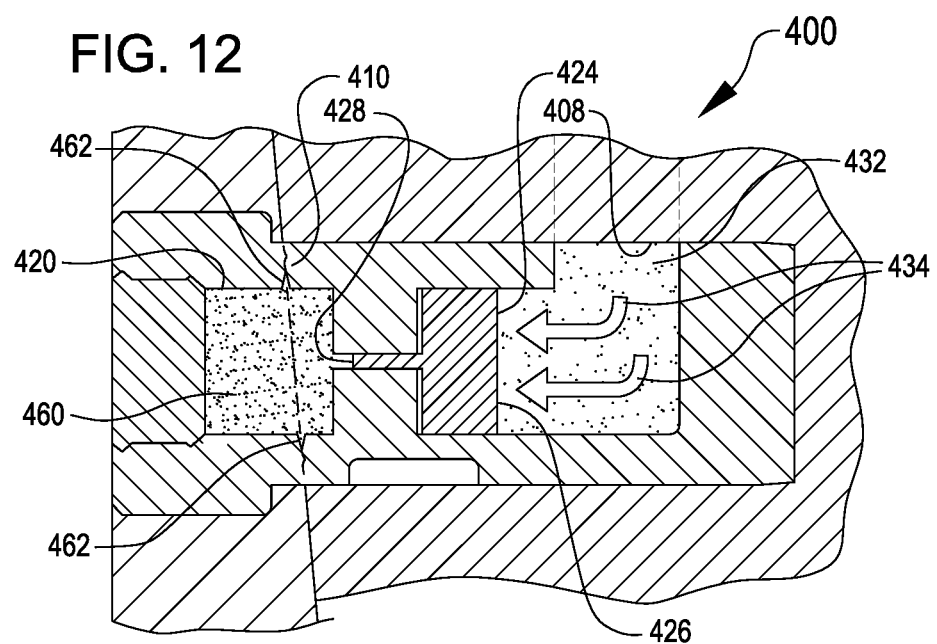
FIG. 12 is a cross-sectional view of the hydraulically assisted shear bolt of FIG. 11 in which hydraulic fluid is received according to some aspects.

Referring to FIG. 12, the first fluid 432 may be introduced through the port 408 and ultimately cause an increase in stress concentration in the shear portion 410. For example, the introduced first fluid 432 may exert a force on the first face 426 of the piston 424, as illustrated by arrows 434 in FIG. 12. This may cause the piston 424 to move, e.g., leftward in FIG. 12. Movement of the piston 224 in response to the pressure exerted on the first face 426 can cause movement of the second face 428 that generates an increase in fluid pressure in the second fluid 460 in the chamber 420. For example, movement of the second face 428 may reduce an amount of volume available for the second fluid 460 in the chamber 420 and correspondingly generate an increase in pressure. In some aspects, the second face 428 is smaller than the first face 426. With such an arrangement, a first pressure communicated to the first face 426 from the first fluid 432 may cause a larger, amplified second pressure to be communicated from the second face 428 to the second fluid 460. This may result from forces on the piston 424 being distributed over a larger area on the first face 426 and over a smaller area over the second face 428.

Increasing the pressure level of the second fluid 460 in the chamber 420 may increase an amount of pressure exerted on the shear portion 410. Such pressure exerted from the chamber 420 to the shear portion 410 may increase a concentration of stress in the shear portion 410. Increasing the concentration of stress in the shear portion 410 may result in a corresponding reduction in a magnitude of force sufficient to cause shearing along the shear portion 410. In some aspects, a wall of the chamber 420 may include grooves 462 sized to reduce a strength of the shear portion 410 or further concentrate stress in the shear portion 410. For example, the grooves 462 may correspond to a reduction in cross-sectional area of the shear portion 410 that may allow the shear portion 410 to shear when experiencing an amount of stress corresponding to an amount of pressure that can be generated in the second fluid 460 in the chamber 420 in response to introduction of the first fluid 432 through the port 408.

Figure 13:
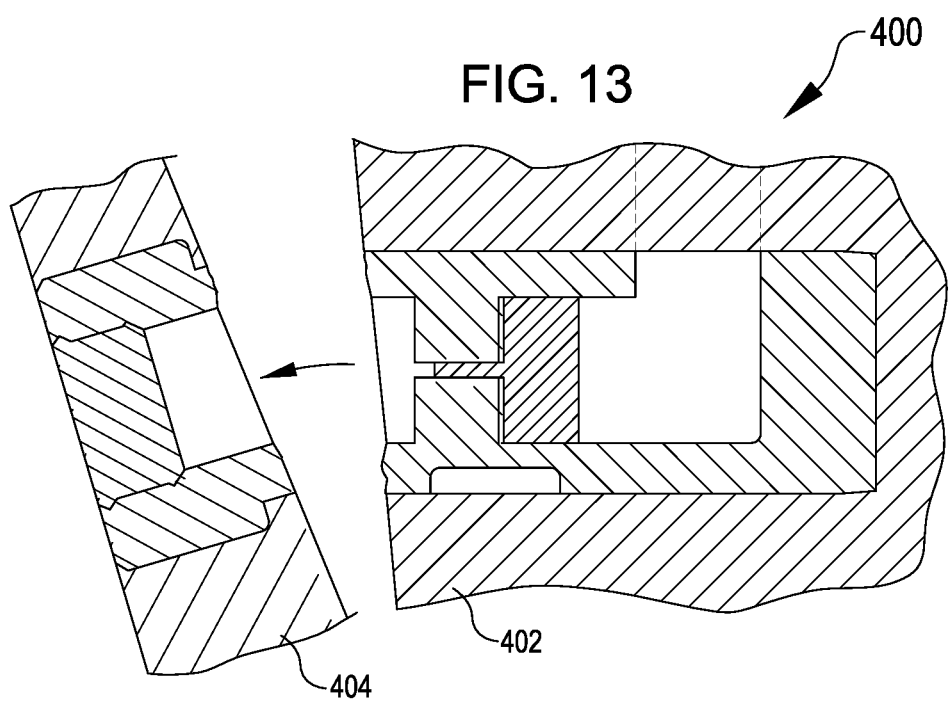
FIG. 13 is a cross-sectional view of the hydraulically assisted shear bolt of FIGS. 11-12 in a sheared state according to some aspects.

FIG. 13 is a cross-sectional view showing the hydraulically assisted shear bolt 400 in a sheared state according to some aspects. In the sheared state, the first component 402 and the second component 404 may be able to move independently of one another. In some aspects, shearing to reach the sheared state may be accomplished (e.g., referring again to FIG. 12) by increasing the pressure level of the second fluid 460 in the chamber 420 to a point that the concentration of stress in the shear portion 410 is above a capacity of the shear portion 410 to withstand. In other aspects, the pressure level of the second fluid 460 in the chamber 420 may be increased to reach a level that is below a capacity of the shear portion 410 to withstand, and forces can be applied from external to the body 406 to cause shearing along the shear portion 410.

In some aspects, a shear bolt, an apparatus, a system, or a method is provided according to one or more of the following examples or according to some combination of the elements thereof. In some aspects, an apparatus or a system described in one or more of these examples can be utilized to perform a method described in one of the other examples.

Example #1

A shear bolt comprising: a body including a shear portion that is shearable in response to forces exerted on the body; a port in the body for introducing a hydraulic fluid into the body; and a core disposed in the body and defining a chamber at least partially surrounded by the shear portion, the core comprising a support structure in the chamber to support the shear portion, the support structure being frangible in response to the hydraulic fluid being introduced through the port to reduce support to the shear portion and allow a fluid pressure in the chamber to be exerted against the shear portion to contribute to shearing the shear portion.

Example #2

The shear bolt of Example #1, or any of the preceding or subsequent examples, wherein the core further comprises a piston movable in response to the hydraulic fluid being introduced through the port.

Example #3

The shear bolt of Example #2, or any of the preceding or subsequent examples, wherein the piston is moveable to cause fracturing of the support structure in response to the hydraulic fluid being introduced through the port.

Example #4

The shear bolt of Example #3, or any of the preceding or subsequent examples, wherein the piston is moveable to contact the support structure to cause the fracturing of the support structure in response to the hydraulic fluid being introduced through the port.

Example #5

The shear bolt of any of Examples #3 or 4, or any of the preceding or subsequent examples, wherein the piston is moveable to generate fluid pressure for at least one of: exerting against the support structure to cause fracturing of the support structure in response to the hydraulic fluid being introduced through the port; or exerting against the shear portion from the chamber in response to the hydraulic fluid being introduced through the port.

Example #6

The shear bolt of any of Examples #2-5, or any of the preceding or subsequent examples, wherein the piston comprises a bypass conduit arranged for passage of the hydraulic fluid from the port to the chamber to at least one of: cause contact of the hydraulic fluid with the support structure for dissolving the support structure; or allow the hydraulic fluid to be introduced into the chamber to increase the fluid pressure in the chamber for exerting against the shear portion to contribute to shearing the shear portion.

Example #7

The shear bolt of any of Examples #2-6, or any of the preceding or subsequent examples, wherein the support structure comprises a support matrix that includes parts that in a first state are combined or joined together and that in a second, different state are disconnected, separate from one another, or otherwise arranged differently than in the first state.

Example #8

A shear bolt comprising: a body including a shear portion; a port in the body for introducing a fluid into the body; and a core disposed in the body and defining a chamber at least partially surrounded by the shear portion, the core comprising a support structure in the chamber and frangible to reduce support to the shear portion in response to the fluid being introduced through the port.

Example #9

The shear bolt of Example #8; wherein the support structure is further frangible to allow a fluid pressure in the chamber to be exerted against the shear portion.

Example #10

The shear bolt of any of Examples #8 or 9, or any of the preceding or subsequent examples, wherein the support structure being frangible comprises the support structure being fracturable in response to the fluid being introduced through the port.

Example #11

The shear bolt of Example #10, or any of the preceding or subsequent examples, further comprising a piston moveable to cause fracturing of the support structure in response to the fluid being introduced through the port.

Example #12

The shear bolt of Example #11, or any of the preceding or subsequent examples, wherein the piston comprises a bypass conduit arranged for passage of fluid from the port to the chamber to cause contact of the fluid with the support structure for dissolving the support structure.

Example #13

The shear bolt of any of Examples #8-12, or any of the preceding or subsequent examples, wherein the support structure being frangible comprises the support structure being chemically reactive to dissolve or weaken in response to contact with a reactive fluid, the reactive fluid comprising the fluid introduced through the port or a fluid brought into contact with the support structure in response to the fluid being introduced through the port.

Example #14

The shear bolt of any of Examples #8, 9, or 13, or any of the preceding or subsequent examples, further comprising a rupture disk arranged to block fluid communication from the port to the support structure in a pre-rupture state.

Example #15

The shear bolt of any of Examples #8-14, or any of the preceding or subsequent examples, further comprising a check valve arranged to release fluid from the chamber in response to the fluid being introduced through the port.

Example #16

A shear bolt comprising: a body including a shear portion; a port in the body for introducing a fluid into the body; and a core disposed in the body, the core comprising a chamber at least partially surrounded by the shear portion, wherein a fluid pressure in the chamber is exerted against the shear portion in increasing amounts to contribute to shearing the shear portion in response to the fluid being introduced through the port.

Example #17

The shear bolt of Example #16, or any of the preceding or subsequent examples, wherein the core comprises a support structure positioned in the chamber and frangible to reduce support to the shear portion in response to the fluid being introduced through the port.

Example #18

The shear bolt of Example #16, or any of the preceding or subsequent examples, wherein the core further comprises a piston movable in response to the fluid being introduced through the port, wherein the piston is moveable to cause an increase in the fluid pressure exerted against the shear portion from the chamber in response to the fluid being introduced through the port.

Example #19

The shear bolt of Example #18, or any of the preceding or subsequent examples, wherein the piston comprises: a first face positioned to receive a first fluid comprising the fluid introduced through the port so as to move in response to receiving the first fluid; and a second face opposite the first face and positioned in communication with a second fluid arranged in the chamber, the second face being smaller than the first face such that a first pressure communicated to the first face from the first fluid causes a larger, amplified second pressure to be communicated from the second face to the second fluid.

Example #20

The shear bolt of any of Examples #16-19, or any of the preceding or subsequent examples, wherein a wall of the chamber comprises grooves sized to reduce a strength of the shear portion.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A shear bolt comprising:
   a body including a shear portion that is shearable in response to forces exerted on the body;
   a port in the body for introducing a hydraulic fluid into the body; and
   a core disposed in the body and defining a chamber at least partially surrounded by the shear portion, the core comprising a support structure that spans between regions of the shear portion along opposite sides of a shear plane, and wherein the support structure is frangible in response to the hydraulic fluid being introduced through the port to reduce support to the shear portion and allow a fluid pressure in the chamber to be exerted against the shear portion to contribute to shearing the shear portion along the shear plane,
   the core further comprising a piston movable in response to the hydraulic fluid being introduced through the port,
   wherein the piston comprises a bypass conduit arranged for passage of the hydraulic fluid from the port to the chamber to at least one of:
      cause contact of the hydraulic fluid with the support structure for dissolving the support structure; or
      allow the hydraulic fluid to be introduced into the chamber to increase the fluid pressure in the chamber for exerting against the shear portion to contribute to shearing the shear portion.

2. The shear bolt of claim 1, wherein the piston is moveable to cause fracturing of the support structure in response to the hydraulic fluid being introduced through the port.

3. The shear bolt of claim 2, wherein the piston is moveable to contact the support structure to cause the fracturing of the support structure in response to the hydraulic fluid being introduced through the port.

4. The shear bolt of claim 2, wherein the piston is moveable to generate fluid pressure for at least one of:
   exerting against the support structure to cause fracturing of the support structure in response to the hydraulic fluid being introduced through the port; or
   exerting against the shear portion from the chamber in response to the hydraulic fluid being introduced through the port.

5. The shear bolt of claim 1, wherein the support structure comprises a support matrix that includes parts that in a first state are combined or joined together and that in a second, different state are disconnected, separate from one another, or otherwise arranged differently than in the first state.

6. A shear bolt comprising:
   a body including a shear portion;
   a port in the body for introducing a fluid into the body;
   a core disposed in the body and defining a chamber at least partially surrounded by the shear portion, the core comprising a support structure that spans between regions of the shear portion along opposite sides of a shear plane, and wherein the support structure is frangible to reduce support to the shear portion in response to the fluid being introduced through the port; and
   a piston comprising a bypass conduit arranged for passage of the fluid from the port to the chamber.

7. The shear bolt of claim 6, wherein the support structure is further frangible to allow a fluid pressure in the chamber to be exerted against the shear portion.

8. The shear bolt of any of claim 7, wherein the support structure being frangible comprises the support structure being fracturable in response to the fluid being introduced through the port.

9. The shear bolt of claim 8, wherein the piston is moveable to cause fracturing of the support structure in response to the fluid being introduced through the port.

10. The shear bolt of claim 6, wherein the support structure being frangible comprises the support structure being chemically reactive to dissolve or weaken in response to contact with a reactive fluid, the reactive fluid comprising the fluid introduced through the port or a fluid brought into contact with the support structure in response to the fluid being introduced through the port.

11. The shear bolt of claim 6, further comprising a rupture disk arranged to block fluid communication from the port to the support structure in a pre-rupture state.

12. The shear bolt of claim 6, further comprising a check valve arranged to release fluid from the chamber in response to the fluid being introduced through the port.

13. A shear bolt comprising:
   a body including a shear portion;
   a port in the body for introducing a fluid into the body;
   a core disposed in the body, the core comprising a chamber at least partially surrounded by the shear portion, wherein a fluid pressure in the chamber is exerted against the shear portion in increasing amounts to contribute to shearing the shear portion in response to the fluid being introduced through the port; and
   a piston movable in response to the fluid being introduced through the port, wherein the piston is moveable to cause an increase in the fluid pressure exerted against the shear portion from the chamber in response to the fluid being introduced through the port, the piston further comprising:
      a first face positioned to receive the fluid introduced through the port so as to move in response to receiving the fluid; and
      a second face opposite the first face and positioned in communication with a second fluid arranged in the chamber, the second face being smaller than the first face such that a first pressure communicated to the first face from the fluid causes a larger, amplified second pressure to be communicated from the second face to the second fluid.

14. The shear bolt of claim 13, wherein the core comprises a support structure that spans between regions of the shear portion along opposite sides of a shear plane, wherein the support structure is frangible to reduce support to the shear portion in response to the fluid being introduced through the port.

15. The shear bolt of claim 13, wherein a wall of the chamber comprises grooves sized to reduce a strength of the shear portion.

* * * * *